United States Patent [19]

Takahashi et al.

[11] Patent Number: 5,100,949

[45] Date of Patent: Mar. 31, 1992

[54] OVERCOATING AGENTS FOR HEAT-SENSITIVE RECORDING MATERIALS

[75] Inventors: Nobuyuki Takahashi, Sakai; Tetsuya Inoue, Osaka; Mika Koda, Itami, all of Japan

[73] Assignee: Arakawa Chemical Industries, Ltd., Osaka, Japan

[21] Appl. No.: 445,850

[22] PCT Filed: Mar. 8, 1989

[86] PCT No.: PCT/JP89/00248

§ 371 Date: Nov. 8, 1989

§ 102(e) Date: Nov. 8, 1989

[87] PCT Pub. No.: WO89/08684

PCT Pub. Date: Sep. 21, 1989

[30] Foreign Application Priority Data

Mar. 11, 1988 [JP] Japan ................. 63-59067

[51] Int. Cl.⁵ ................................. C08F 2/16
[52] U.S. Cl. ......................... 524/459; 524/503; 524/732
[58] Field of Search ............. 524/503, 459, 732

[56] References Cited

U.S. PATENT DOCUMENTS 3,755,234  8/1973  Chujo et al. ............ 524/459
3,914,017  10/1975  Bedell et al. ........... 524/459 X
4,581,394  4/1986  Yoshida et al. ......... 525/59 X
4,708,947  11/1987  Maruyama et al. ...... 524/503 X

*Primary Examiner*—Joseph L. Schofer
*Assistant Examiner*—J. M. Reddick
*Attorney, Agent, or Firm*—Larson and Taylor

[57] ABSTRACT

This invention provides (i) an overcoating agent for heat-sensitive recording materials which contains as an active component an emulsion of a graft copolymer prepared by graft-copolymerizing an acrylamide or methacrylamide as a monomer (A), a methyl acrylate or methacrylate as a monomer (B), an acrylic or methacrylic acid as a monomer (C) and if required, a monomer other than said monomers as a monomer (D) which is copolymerizable therewith onto a polyvinyl alcohol in the presence of a fatty acid ester of sucrose and water, and (ii) an overcoating agent for heat-sensitive recording materials which contains as an active component an emulsion of a graft copolymer prepared by graft-copolymerizing a methyl acrylate or methacrylate as a monomer (E), a lower hydroxyalkyl acrylate or methacryalte as a monomer (F), an acrylic or methacrylic acid as a monomer (G) and if required, a monomer other than said monomers as a monomer (H) which is copolymerizable therewith onto a polyvinyl alcohol in the presence of a fatty acid ester of sucrose and water.

7 Claims, No Drawings

OVERCOATING AGENTS FOR HEAT-SENSITIVE RECORDING MATERIALS

FIELD OF THE INVENTION

The present invention relates to a novel overcoating agent for heat-sensitive recording materials.

BACKGROUND ART

Heat-sensitive recording materials comprising a colorless or pale-colored leuco dye and a color developer which, when heated, combines with the leuco dye to form a color have been widely used for various purposes. Common heat-sensitive recording materials can be prepared by dispersing and pulverizing a leuco dye and a color developer such as a phenolic substance each separately by a wet mill into micron-size particles, mixing together the particles of the two components, adding auxiliaries such as a binder, sensitizer, filler, lubricant, stabilizer, dispersant, antifoamer and the like to give a liquid coating composition, and applying the coating composition to a substrate such as papers, films or synthetic papers. The foregoing heat-sensitive recording materials form colored record images on chemical reaction which occurs when at least one of the leuco dye and the color developer is fused to come into contact with the other. With the advantage of easily producing record images, especially sharp images, this type of heat-sensitive recording materials are widely used as recording media for facsimiles, printers, etc.

As information media have been recently diversified, the heat-sensitive recording materials have found wider applications, e.g. as ticket papers useful for machines for automatically producing tickets such as commutation tickets, as bar code papers in a POS (point of sales) system or as labels for commercial goods or the like. The heat-sensitive recording materials used for such new applications have become more frequently exposed to severer conditions than when used under circumstances heretofore known. For example, the heat-sensitive recording materials cause fading at a recorded portion or the formation of color at an unrecorded portion on contact with a commutation-ticket holder comprising vinyl chloride and dibutyl phthalate or like plasticizer, becoming less valuable as recording materials, which means that the heat-sensitive recording materials are required to have resistance to plasticizers. For use as labels for foods, the heat-sensitive recording materials need to have resistance to water, alcohols, oils and acetic acids and the like in addition to resistance to plasticizers.

To meet such performance requirements, various methods for preventing the penetration of water, chemicals or the like have been employed by coating the heat-sensitive color-forming layer on the substrate with an overcoating agent such as an aqueous solution of a water-soluble resin or an emulsion of a water-insoluble resin or the like (e.g. a styrene-maleate copolymer as disclosed in Japanese Unexamined Patent Publication No.62-280073, a polyvinyl alcohol-vinyl acetate emulsion as disclosed in Japanese Unexamined Patent Publication No. 61-229590, an aqueous solution of a polyvinyl alcohol-acrylamide copolymer as disclosed in Japanese Unexamined Patent Publication No.62-278086, etc.). These methods can satisfy said performance requirements to some extent but can never exhibit concurrently a satisfactory resistance to water, plasticizers and chemicals as well as a sufficient resistance to sticking and the desired color forming property.

DISCLOSURE OF THE INVENTION

It is an object of the present invention to provide a novel overcoating agent for heat-sensitive recording materials which is free of all the drawbacks of conventional overcoating agents for heat-sensitive recording materials.

It is another object of the invention to provide a novel overcoating agent for heat-sensitive recording materials which is capable of imparting an excellent resistance to water, plasticizers, chemicals and sticking, an outstanding color forming property and the like to heat-sensitive recording papers and like materials.

These and other objects of the invention will become apparent from the following description.

According to the present invention, there are provided:

(i) an overcoating agent for heat-sensitive recording materials which contains as an active component an emulsion of a graft copolymer prepared by graft-copolymerizing an acrylamide or methacrylamide as a monomer (A), a methyl acrylate or methacrylate as a monomer (B), an acrylic or methacrylic acid as a monomer (C) and if required, a monomer other than said monomers as a monomer (D) which is copolymerizable therewith onto a polyvinyl alcohol in the presence of a fatty acid ester of sucrose and water, and (ii) an overcoating agent for heat-sensitive recording materials which contains as an active component an emulsion of a graft copolymer prepared by graft-copolymerizing a methyl acrylate or methacrylate as a monomer (E), a lower hydroxyalkyl acrylate or methacrylate as a monomer (F), an acrylic or methacrylic acid as a monomer (G) and if required, a monomer other than said monomers as a monomer (H) which is copolymerizable therewith onto a polyvinyl alcohol in the presence of a fatty acid ester of sucrose and water.

In view of the foregoing current situation, the present inventors conducted extensive research and found that the above specific emulsions of graft copolymers can obviate all the drawbacks which the conventional overcoating agents for heat-sensitive recording materials fail to remedy satisfactorily, in respect of resistance to water, plasticizers, chemicals and sticking, a color forming property, etc.

The present invention has been accomplished on the basis of these novel findings.

The overcoating agents for heat-sensitive recording materials (hereinafter referred to as "overcoating agent") according to the invention can be prepared by graft-copolymerizing (i) the monomers (A), (B) and (C) and the monomer (D) if necessary, or (ii) the monomers (E), (F) and (G) and, if necessary, the monomer (H) onto a polyvinyl alcohol in the form of an aqueous solution containing the fatty acid ester of sucrose as an emulsifying agent. The objects of the invention can be achieved only by the use of the obtained overcoating agent.

The polyvinyl alcohols for use in the present invention are not specifically limited and can be any of those heretofore known insofar as they are soluble in water. That is, the polyvinyl alcohol may be either a partially saponified one or a completely saponified one. Also usable are modified polyvinyl alcohols such as siliconmodified, carboxyl-modified or acetoacetyl-modified polyvinyl alcohols. Among them, preferable are partially saponified or completely saponified polyvinyl alcohols having a polymerization degree of about 200 to about 2500 and a saponification degree of 75 to 100%. The amount of the polyvinyl alcohol to be used is suitably determined in view of the film-forming property of the obtained overcoating agent and the resistance thereof to water, chemicals and plasticizers which are affected by the polyvinyl alcohol. The amount usually ranges from 5 to 50 parts by weight (hereinafter indicated merely as part or parts), preferably 10 to 30 parts, per 100 parts of the total amount of the monomers to be described later. Use of less than 5 parts of the polyvinyl alcohol tends to reduce the film-forming property of the overcoating agent, its resistance to chemicals and its color forming property, whereas use of more than 50 parts thereof is likely to decrease the water resistance of the overcoating agent and to increase the viscosity of the resulting liquid coating composition.

The graft chain-forming monomers to be used for the graft copolymerization in the invention are (i) the monomers (A), (B) and (C) as the essential components and the monomer (D) as an optional component which is copolymerizable with the essential components, and (ii) the monomers (E), (F) and (G) as the essential components, and the monomer (H) as an optional component which is copolymerizable with the essential components.

First, the monomers (A), (B), (C) and (D) will be described below.

The monomer (A) is used as an essential component because it is effective in enhancing the film-forming property of the obtained overcoating agent, its resistance to chemicals and the color density. The amount of the monomer (A) to be used is about 5 to about 40% by weight, preferably about 10 to about 35% by weight, of 100% by weight of the total amount of the monomers to be used in the invention. The amount of less than 5% by weight results in failure to meet the foregoing performance requirements, whereas the amount exceeding 40% by weight tends to increase the viscosity of the liquid coating composition, making it difficult to obtain a stable emulsion.

The monomer (B) is used as an essential component because it increases the water resistance of the obtained overcoating agent. The amount of the monomer (B) to be used is suitably determined in view of the water resistance of the obtained overcoating agent, and ranges from about 40 to about 90% by weight, preferably about 50 to about 80% by weight, of 100% by weight of the total amount of the monomers to be used in the invention. The amount of less than 40% by weight is apt to render the water resistance insufficient, whereas the amount exceeding 90% by weight tends to reduce the resistance to solvents.

The monomer (C) is used as an essential component because it affects the chemical resistance of the obtained overcoating agent and the color density, particularly the resistance to sticking on color development by a dynamic method. The amount of the monomer (C) to be used can be suitably determined in view of the foregoing properties, and is in the range of 1 to 20% by weight, preferably 1 to 15% by weight, of 100% by weight of the total amount of the monomers to be used in the invention. Below 1% by weight, a stable emulsion tends to become difficult to obtain, whereas above 20% by weight, the chemical resistance is likely to diminish.

The monomer (D) is used as the optional component in the invention. Specific examples of the monomer (D) are ethyl acrylate or methacrylate, butyl acrylate or methacrylate, propyl acrylate or methacrylate, 2-ethylhexyl acrylate or methacrylate, octyl acrylate or methacrylate, acrylonitrile or methacrylonitrile, vinyl acetate, styrene, etc. The amount of the monomer (D) to be used can be suitably determined within the range in which the obtained overcoating agent can achieve the objects of the invention and can sustain the contemplated effects of the invention. The amount is preferably in the range of about 30% by weight or less of 100% by weight of the total amount of the monomers to be used in the invention.

Next the monomer components of monomers (E), (F), (G) and (H) will be described below.

The monomer (E) is used as an essential component because it increases the water resistance of the obtained overcoating agent. The amount of the monomer (E) to be used is about 15 to about 85% by weight, preferably about 25 to about 60% by weight, of 100% by weight of the total amount of the monomers to be used in the invention. Below 15% by weight, reduced resistance to water and sticking tends to result, whereas above 85% by weight, the chemical resistance is prone to reduce due to the impairment of the film-forming property.

The monomer (F) is used as an essential component because it enhances the resistance of the overcoating agent to chemicals and plasticizers. Specific examples of the monomer (F) are 2-hydroxyethyl acrylate or methacrylate, 2-hydroxypropyl acrylate or methacrylate, etc. The amount of the monomer (F) to be used is determined in view of the resistance of the obtained overcoating agent to chemicals and plasticizers and is in the range of about 15 to about 75% by weight, preferably about 20 to about 45% by weight, of 100% by weight of the total amount of the monomers to be used in the invention. Below 15% by weight, insufficient resistance to chemicals and plasticizers tends to result, whereas above 75% by weight, gelation is prone to occur during the polymerization reaction, and a highly viscous reaction product tends to form.

The monomer (G) is used as an essential component because it affects the chemical resistance of the obtained overcoating agent, the color density and the stability of the emulsion during the graft polymerization. The amount of the monomer (G) to be used can be suitably determined in view of the foregoing properties, and is in the range of about 5 to about 50% by weight, preferably about 10 to about 30% by weight, of 100% by weight of the total amount of the monomers to be used in the invention. Below 5% by weight, a stable emulsion is likely to become difficult to obtain, whereas above 50% by weight, the water resistance and the stability of the emulsion tend to diminish.

The monomer (H) is used as an optional component in the invention. Specific examples of the monomer (H) are ethyl acrylate or methacrylate, propyl acrylate or methacrylate, butyl acrylate or methacrylate, 2-ethylhexyl acrylate or methacrylate, octyl acrylate or methacrylate, acrylonitrile or methacrylonitrile, vinyl acetate, styrene, acrylamide or methacrylamide, etc. While properly determinable within the range in which the obtained overcoating agent can achieve the objects and can sustain the contemplated effects of the invention, the amount of the monomer (H) to be used is preferably about 30% by weight or less of 100% by weight of the total amount of the monomers to be used in the invention. It is critical in the present invention to use a fatty acid ester of sucrose as an emulsifier. If a conventional anionic or nonionic lower-molecular weight surfactant is used for graft copolymerization of (i) the monomers (A), (B) and (C) and the monomer (D) if required or (ii) the monomers (E), (F) and (G) and the monomer (H) if required, the resulting overcoating agent is given a markedly reduced resistance to water and sticking and can not achieve the objects of the invention at all. In this case, a stable emulsion of graft copolymer can be obtained only by use of a fatty acid ester of sucrose in the copolymerization reaction during which there occurs emulsification of fine oily droplets of (i) the monomers (A), (B) and (C) and the monomer (D) if required and (ii) the monomers (E), (F) and (G) and the monomer (H) if required. Moreover, the obtained graft copolymer emulsion can be used as an overcoating agent highly resistant to sticking without addition of a filler and other additives.

The fatty acid ester of sucrose for use herein is an ester of a sucrose with a fatty acid and can be any of conventional such esters including various species from fatty acid monoesters of sucroses to completely esterified products of sucroses with fatty acids. Included among desirable fatty acids are higher fatty acids having about 6 to about 22 carbon atoms, preferably about 10 to about 20 carbon atoms. Specific examples of such fatty acids are capric acid, lauric acid, myristic acid, palmitic acid, stearic acid, oleic acid, linoleic acid, docosanoic acid, etc. The HLB of useful fatty acid esters of sucroses is not specifically limited, but is usually in the range of about 1 to about 16, preferably about 5 to about 16, in view of the coating surface becoming more smooth with an increase of HLB.

The amount of the fatty acid ester of sucrose to be used is about 1 to about 30 parts, preferably about 5 to about 15 parts, per 100 parts of the total amount of the monomers to be used in the invention. The amount of less than 1 part makes it difficult to obtain a stable emulsion and tends to reduce the resistance to sticking, whereas the amount exceeding 30 parts is likely to give a larger amount of foam during the polymerization and to render the chemical resistance insufficient.

The processes for preparing the graft copolymer serving as the active component in the invention are not specifically limited, and various processes can be employed. The graft copolymer can be easily prepared, for example, by the following processes. Into a reactor are placed the polyvinyl alcohol, the fatty acid ester of sucrose for use as the emulsifier and water in predetermined amounts. The mixture is stirred to give an aqueous solution. Added thereto are (i) the monomers (A), (B) and (C) and the monomer (D) if required, or (ii) the monomers (E), (F) and (G) and the monomer (H) if required, and a radical polymerization initiator, followed by simultaneous reaction of the mixture. Alternatively a process is feasible in which the components are continuously placed dropwise into or discontinuously and separately fed to the reactor in the course of reaction. Both modes of reaction are performed usually at a temperature of about 60° to about 90° C. for about 1 to about 4 hours to complete the polymerization. The concentration of the monomers for the polymerization is not specifically limited not only in any of said polymerization methods but in any other methods. Yet it is usually in the range of about 10 to about 50% by weight, preferably about 15 to about 40% by weight, based on the solution of mixed components. Useful radical polymerization initiators are not specifically limited and can be suitably selected from the conventional water-soluble initiators such as hydrogen peroxide, ammonium persulfate, potassium persulfate, etc. The amount of the radical polymerization initiator to be used is usually about 0.1 to about 5 parts by weight per 100 parts by weight of the total amount of the monomers to be used in the invention. A reducing agent can be used conjointly with the radical polymerization initiator to form a redox initiator. A chain transfer agent such as mercaptans can be used to impart the desired viscosity by adjusting the degree of polymerization.

The graft copolymer emulsions prepared by the above methods for use as the active component for the overcoating agents of the invention can be used directly as overcoating agents for various heat-sensitive recording materials including ticket papers useful for machines for automatically producing tickets, bar code papers for a POS system, etc., as stated hereinbefore. These emulsions can exhibit an excellent resistance to water, chemicals, plasticizers and sticking and can inhibit the decrease of the color forming property. If required, the water resistance of the overcoating agent can be further improved by use of a conventional agent for improving the water resistance such as an epichlorohydrin-modified polyamidepolyamine resin, amino-formaldehyde resin or the like in conjunction with the graft copolymer emulsion of the invention. While the graft copolymer emulsion of the invention can be used singly as the overcoating agent of high sticking resistance, the sticking resistance can be further enhanced by addition of a higher fatty acid, higher fatty acid amide, metal salt of higher fatty acid or the like. A preferred amount of the water resistance-improving agent to be used is about 5 to about 30 parts (calculated as solids) per 100 parts of the graft copolymer emulsion. A preferred amount of the metal salt of higher fatty acid or the like to be used is about 5 to about 20 parts (calculated as solids) per 100 parts of the graft copolymer emulsion.

The preferred concentration and viscosity of the overcoating agent to be applied to a heat-sensitive recording material are not specifically limited in the invention, and yet are usually about 10 to about 30% by weight and about 50 to about 500 cps, respectively, at a pH of about 4.5 to about 9.5. The application methods are not specifically limited and can usually employ a wire bar, blade coater, air knife coater, roll coater or the like. The amount of the overcoating agent to be applied is not specifically limited and can be suitably determined depending on the kind of the heat-sensitive recording material and the like. Preferably the amount of the overcoating agent to be applied is adjusted to the range of about 0.5 to about 15 g/m$^2$, calculated as solids.

After application, the coating is dried with use of a conventional dryer such as an oven, drum dryer or the like.

Conventional heat-sensitive recording materials can be used as they are for application with the overcoating agent of the invention. More specifically, the conventional heat-sensitive recording materials referred to herein are those comprising a base sheet and a heat-sensitive layer of leuco dye and color developer both adhered to the base sheet with a binder. These heat-sensitive recording materials are useful as ticket papers for machines for automatically producing tickets, bar code papers in a POS system, labels for goods, etc.

Examples of the binder are polyvinyl alcohol, carboxymethyl cellulose, hydroxyethyl cellulose, methoxy cellulose, carboxy-modified polyvinyl alcohol, polyacrylamide, polyacrylic acid, starch and derivatives thereof, casein, gelatin, alkali salt of styrene-maleic anhydride copolymer and like water-soluble high-molecular weight compounds and styrene-butadiene latex and like water-insoluble resins.

Useful leuco dyes can be any of conventional ones and include lactone type dyes having a lactone ring in the molecule and non-lactone type dyes having no lactone ring in the molecule. Preferable among the lactone type are lactone compounds such as triphenylmethane type and fluoran type compounds.

Examples of useful fluoran-type compounds are 2-anilino-3-methyl-6-diethylaminofluoran, 2-anilino-3-methyl-6-(methylcyclohexylamino)fluoran, 2-anilino-3-methyl-6-(ethylisobenzylamino)fluoran, 2-(p-chloroanilino)-3-methyl-6-diethylaminofluoran, 2-(p-fluoroanilino)-3-methyl-6-diethylaminofluoran, 2-anilino-3-methyl-6-(p-toluidinoethylamino)fluoran, 2-(p-toluidino)-3-methyl-6-diethylaminofluoran, 2-(o-chloroanilino)-6-dibutylaminofluoran, 2-(o-fluoroanilino)-6-diethylaminofluoran, 2-(o-fluoroanilino)-6-dibutylaminofluoran, 2-anilino-3-methyl-6-piperidinofluoran, 2-anilino-3-methyl-6-pyrrolidinofluoran, 2-ethoxyethylamino-3-chloro-6-diethylaminofluoran, 2-anilino-3-chloro-6diethylaminofluoran, 2-chloro-6-diethylaminofluoran, 2-methyl-6-diethylaminofluoran, etc. Examples of useful triarylmethane-type compounds are 3,3-bis-(p-dimethylaminophenol)-6-dimethylaminophthalide (alias, crystal violet lactone), 3,3-bis-(p-dimethylaminophenol)phthalide, 3-(p-dimethylaminophenol)-3-(1,2-dimethylaminoindol-3-yl)phthalide, etc. These leuco dyes are usable singly or in admixture.

Useful color developers include, for example, p-octylphenol, p-tert-butylphenol, 1,1-bis(p-hydroxyphenyl)propane, 2,2-bis-(p-hydroxyphenyl)propane, 1,1-bis(p-hydroxyphenyl)cyclohexane, 4,4-thiobisphenol, 4,4-sulfonyldiphenol, bis(3-allyl-4-hydroxyphenyl)sulfone, novolak-type phenolic resin, p-hydroxybenzoate, 4-hydroxydimethylphthalate, 5-hydroxydimethylisophthalate, 3,5-di-tert-butylsalicylic acid, 3,5-di-α-methylbenzylsalicylic acid, etc. As to aromatic carboxylic acid, polyvalent metal salts thereof may be used.

Examples of useful fillers are calcium carbonate, magnesium carbonate, titanium oxide, zinc oxide, silica, aluminum hydroxide, zinc hydroxide, barium sulfate, clay, talc, surface-treated particles of inorganic materials such as calcium or silica, particles of organic materials such as urea-formalin resins or polystyrene resins, etc.

When required, it is possible to add other additives such as zinc stearate, calcium stearate, amide stearate and like lubricants, surfactants, antifoamers, emulsifiers, stabilizers, sensitizers and like auxiliaries.

Examples of substrates on which a heat-sensitive color-forming layer can be formed are papers, synthetic papers, films, etc.

BEST MODE FOR CARRYING OUT THE INVENTION

Given below are examples and comparative examples to describe the present invention in greater detail. However, the invention is not limited to the examples.

EXAMPLE 1

Into a reactor equipped with a stirrer and a reflux condenser were placed 40 parts by weight (hereinafter the parts are all by weight) of a completely saponified polyvinyl alcohol having a polymerization degree of 1100 (hereinafter referred to as PVA 110) and 560 parts of water. The mixture was stirred with heating for dissolution to obtain an aqueous solution. To the aqueous solution were added 20 parts of acrylamide, 75 parts of methyl methacrylate, 5 parts of methacrylic acid and 10 parts of fatty acid ester of sucrose ("Ryoto-Sugar Ester S1570," 15 in HLB, product of Mitsubishi Kasei Shokuhin Kabushiki Kaisha). The mixture was stirred at room temperature for 30 minutes for emulsification. To the emulsion was added 1.0 part of ammonium persulfate as a polymerization initiator, and the mixture was heated to 80° C. and maintained at the same temperature for 2 hours to complete the reaction after which the reaction mixture was neutralized with ammonia, giving 750 parts of an emulsion of graft copolymer. The emulsion was found to have a nonvolatile content of 20% by weight, a pH of 6.2 and a viscosity of 300 cps at 25° C.

The emulsion obtained above was applied as an overcoating agent onto a commercially available heat-sensitive recording paper (heat-sensitive recording paper manufactured by Canon Inc. for GIII, and weighing 60 g/m$^2$) in an amount of 3.0 to 4.0 g/m$^2$ calculated as solids and dried, giving a heat-sensitive recording paper having the heat-sensitive color-forming layer coated with the overcoating agent (hereinafter referred to as heat-sensitive recording paper). Record images were formed on the thus obtained heat-sensitive recording papers by the following methods.

Dynamic method: record images were produced with a tester "TH-PMD" (product of Ohkura Electric Co., Ltd.) for testing heat-sensitive recording materials for the degree of color development.

Static method: record images were produced with "Iron Tester No. 137" (product of Yasuda Seiki Seisaku Sho Kabushiki Kaisha).

The heat-sensitive recording papers with the record images formed thereon were tested for a color forming property, resistance to water, plasticizers, sticking and solvents by the following methods. Table 2 below shows the results.

Color forming property

The color density of the recorded portion on the heat-sensitive recording paper having record images formed thereon (by the dynamic or static method) was determined with use of a Sakura densitometer, "PDA 65". The density of the background was determined with use of a Sakura densitometer, "PDA 65" in the same manner as the color density.

Water resistance

The heat-sensitive recording papers with record images formed thereon were immersed in water at 20° C. for 24 hours, and observed to evaluate the degree of the fading and the strength of the base sheet.

Evaluation of test results

A: Good
B: Fair
C: Poor

Resistance to plasticizers

Dioctyl phthalate was applied with a brush onto the recorded portion of the heat-sensitive recording paper having record images formed thereon, and the resistance to plasticizers was determined according to the degree of fading occurring in 2 hours.

Evaluation of test results
A: Good
B: Fair
C: Poor

Resistance to sticking

The resistance to sticking was determined according to the intensity of the sticking sound produced during the formation of record images with the tester for testing heat-sensitive recording papers for the degree of color development.

Evaluation of test results
A: No sticking sound produced
B: Slight degree of sticking sound produced
C: Marked degree of sticking sound produced

Resistance to solvents

The background of the heat-sensitive recording paper was painted red with a red felt pen (product of Pentel Kabushiki Kaisha) and the resistance to solvents was determined according to the degree of bleeding.

Evaluation of test results
A: No bleeding
B: Slight degree of bleeding
C: Bleeding reaching the rear side

EXAMPLES 2 TO 13 AND COMPARATIVE EXAMPLES 1 TO 3

The same procedure as in Example 1 was repeated with the exception of replacing the polyvinyl alcohols, emulsifiers, monomers (A), (B) and (C) and monomer (D) if required with respective counterparts different in kind and amount as shown in Table 1 below, producing heat-sensitive recording papers. The thus obtained heat-sensitive recording papers were subjected to the same performance tests as in Example 1. Table 1 shows the composition and the properties of the overcoating agents thus prepared and Table 2 below the results obtained by testing the heat-sensitive recording papers for properties.

TABLE 1

| | Polyvinyl alcohol | | Monomer (A) AM (part) | Monomer (B) MMA (part) | Monomer (C) MAA (part) | Monomer (D) Kind (part) | Emulsifier | | Solids (%) | pH | Viscosity (cps) |
|---|---|---|---|---|---|---|---|---|---|---|---|
| | Kind | Amount (part) | | | | | Kind | Amount (part) | | | |
| Example | | | | | | | | | | | |
| 1 | PVA110 | 40 | 20 | 75 | 5 | | S1570 | 10 | 20 | 6.2 | 300 |
| 2 | " | 40 | 30 | 65 | 5 | | " | 10 | 20 | 6.2 | 600 |
| 3 | " | 40 | 35 | 60 | 5 | | " | 10 | 20 | 6.1 | 1200 |
| 4 | " | 40 | 20 | 78 | 2 | | " | 10 | 20 | 5.4 | 500 |
| 5 | " | 40 | 20 | 75 | 5 | | S570 *3 | 10 | 20 | 6.2 | 1500 |
| 6 | " | 40 | 20 | 75 | 5 | | S1170 *4 | 10 | 20 | 6.2 | 1400 |
| 7 | " | 40 | 20 | 75 | 5 | | P1570 *5 | 10 | 20 | 6.1 | 1200 |
| 8 | " | 40 | 20 | 75 | 5 | | S1570/S570 *6 | 10 | 20 | 6.2 | 400 |
| 9 | " | 40 | 20 | 75 | 5 | | S1570 | 5 | 20 | 6.2 | 400 |
| 10 | " | 40 | 20 | 75 | 5 | | " | 15 | 20 | 6.2 | 450 |
| 11 | " | 25 | 20 | 75 | 5 | | " | 10 | 20 | 6.1 | 170 |
| 12 | " | 60 | 20 | 75 | 5 | | " | 10 | 20 | 6.2 | 800 |
| 13 | Z100 *1 | 40 | 20 | 75 | 5 | | " | 10 | 20 | 6.2 | 500 |
| Comp. Ex. | | | | | | | | | | | |
| 1 | PVA110 | 40 | 20 | 75 | 5 | | EPAN 720 *7 | 2 | 20 | 6.2 | 470 |
| 2 | PVA117 *2 | 100 | 70 | 10 | | AA 20 | | | 10 | 6.9 | 1500 |
| 3 | " | 100 | | | | | | | 10 | 4.1 | 1000 |

Note to Table 1
The symbols *1 to *7 in Table 1 designate the following.
*1: Acetoacetylated polyvinyl alcohol, product of The Nippon Synthetic Chemical Industry Co., Ltd.;
*2: Completely saponified polyvinyl alcohol, product of Kurare Kabushiki Kaisha.
*3: Fatty acid ester of sucrose ("Ryoto-Sugar Ester S570," 5 in HLB, product of Mitsubishi Kasei Shokuhin Kabushiki Kaisha);
*4: Fatty acid ester of sucrose ("Ryoto-Sugar Ester S1570," 15 in HLB, product of Mitsubishi Kasei Shokuhin Kabushiki Kaisha);
*5: Fatty acid ester of sucrose ("Ryoto-Sugar Ester P1570," 15 in HLB, product of Mitsubishi Kasei Shokuhin Kabushiki Kaisha);
*6: S1570/S570 = 1:1 mixture (weight ratio);
*7: Nonionic emulsifier (polypropylene glycol polyethylene glycol ether).

In Table 1, AM is short for acrylamide, MMA for methyl methacrylate, MAA for methacrylic acid and AA for acrylic acid.

TABLE 2

| | Color forming property | | | Resistance to water | Resistance to plasticizers | Resistance to sticking | Resistance to solvents |
|---|---|---|---|---|---|---|---|
| | Color density (static) | Color density (dynamic) | Density of background | | | | |
| Ex. | | | | | | | |
| 1 | 1.44 | 1.46 | 0.14 | A | A | A | A |
| 2 | 1.53 | 1.41 | 0.15 | A | A | A | A |
| 3 | 1.55 | 1.48 | 0.16 | A | A | A | A |
| 4 | 1.36 | 1.37 | 0.15 | A | A | A | A |
| 5 | 1.51 | 1.56 | 0.15 | A | A | A | A |
| 6 | 1.46 | 1.52 | 0.14 | A | A | A | A |
| 7 | 1.41 | 1.39 | 0.15 | A | A | A | A |

TABLE 2-continued

|   | Color forming property | | | Resistance to water | Resistance to plasticizers | Resistance to sticking | Resistance to solvents |
|---|---|---|---|---|---|---|---|
|   | Color density (static) | Color density (dynamic) | Density of background | | | | |
| 8 | 1.51 | 1.57 | 0.16 | A | A | A | A |
| 9 | 1.40 | 1.45 | 0.15 | A | A | A | A |
| 10 | 1.45 | 1.48 | 0.16 | A | A | A | A |
| 11 | 1.32 | 1.34 | 0.14 | A | A | A | A |
| 12 | 1.50 | 1.38 | 0.15 | A | A | B | A |
| 13 | 1.44 | 1.42 | 0.14 | A | A | A | A |
| Comp. Ex. | | | | | | | |
| 1 | 1.42 | 1.46 | 0.15 | B | C | C | A |
| 2 | 1.55 | 1.41 | 0.17 | C | A | C | A |
| 3 | 1.50 | 1.23 | 0.16 | C | A | C | A |

EXAMPLES 14 TO 24 AND COMPARATIVE agents and Table 4 below the results obtained by testing the heat-sensitive recording papers for properties.

TABLE 3

|  | Polyvinyl alcohol | | Monomer (A) MMA (part) | Monomer (B) HEA (part) | Monomer (C) MMA (part) | Emulsifier | | Solids (%) | pH | Viscosity (cps) |
|---|---|---|---|---|---|---|---|---|---|---|
|  | Kind | Amount (part) | | | | Kind | Amount (part) | | | |
| Example | | | | | | | | | | |
| 14 | PVA110 | 40 | 40 | 35 | 25 | S1570 | 10 | 20 | 5.2 | 200 |
| 15 | " | 20 | 40 | 35 | 25 | " | 10 | 20 | 5.2 | 150 |
| 16 | " | 40 | 50 | 40 | 10 | " | 10 | 20 | 5.2 | 150 |
| 17 | " | 40 | 30 | 20 | 50 | " | 10 | 20 | 5.2 | 150 |
| 18 | " | 40 | 40 | 35 | 25 | S570 *3 | 10 | 20 | 5.2 | 150 |
| 19 | " | 40 | 40 | 35 | 25 | S1170 *4 | 10 | 20 | 5.1 | 290 |
| 20 | " | 40 | 40 | 35 | 25 | P1570 *5 | 10 | 20 | 5.1 | 240 |
| 21 | " | 40 | 40 | 35 | 25 | S1570/S570 *6 | 10 | 20 | 5.1 | 250 |
| 22 | " | 40 | 40 | 35 | 25 | S1570 | 5 | 20 | 5.2 | 310 |
| 23 | " | 40 | 40 | 35 | 25 | " | 15 | 20 | 5.2 | 200 |
| 24 | Z100 *1 | 40 | 40 | 35 | 25 | " | 10 | 21 | 5.0 | 70 |
| Comp. Ex. | | | | | | | | | | |
| 4 | PVA110 | 40 | 40 | 35 | 25 | NEOCOL P *7 | 1 | 15 | 5.3 | 350 |
| 5 | PVA117 *2 | 100 | | | | | | 10 | 4.1 | 1000 |

EXAMPLES 4 AND 5

The same procedure as in Example 1 was repeated with the exception of replacing the polyvinyl alcohols, emulsifiers, monomers (E), (F) and (G) and monomer (H) if required with respective counterparts different in kind and amount as shown in Table 3 below, producing heat-sensitive recording papers. The obtained heat-sensitive recording papers were subjected to the same performance tests as in Example 1. Table 3 shows the composition and the properties of the obtained overcoating In Table 3, MMA stands for methyl methacrylate, HEA for 2-hydroxyethyl acrylate and MAA for methacrylic acid.

The details of the symbols *1 to *6 are as described in the note to Table 1. The symbol *7 shows an anionic emulsifier (soda salt of dialkylsulfosuccinate) manufactured by Dai-ichi Kogyo Seiyaku Co., Ltd.

TABLE 4

|  | Color forming property | | | Resistance to water | Resistance to plasticizers | Resistance to sticking | Resistance to solvents |
|---|---|---|---|---|---|---|---|
|  | Color density (static) | Color density (dynamic) | Density of background | | | | |
| Ex. | | | | | | | |
| 14 | 1.65 | 1.67 | 0.16 | A | A | A | A |
| 15 | 1.55 | 1.56 | 0.16 | A | A | A | A |
| 16 | 1.58 | 1.59 | 0.15 | A | A | A | A |
| 17 | 1.43 | 1.50 | 0.16 | A | A | A | A |
| 18 | 1.56 | 1.60 | 0.16 | A | A | A | A |
| 19 | 1.66 | 1.66 | 0.16 | A | A | A | A |
| 20 | 1.65 | 1.68 | 0.15 | A | A | A | A |
| 21 | 1.63 | 1.66 | 0.16 | A | A | A | A |
| 22 | 1.60 | 1.67 | 0.15 | A | A | A | A |
| 23 | 1.65 | 1.67 | 0.15 | A | A | A | A |
| 24 | 1.60 | 1.58 | 0.16 | A | A | A | A |
| Comp. Ex. | | | | | | | |
| 4 | 1.48 | 1.18 | 0.14 | C | A | C | A |
| 5 | 1.60 | 1.23 | 0.16 | C | A | C | A |

The overcoating agent of the present invention prepared by graft polymerization of the specific monomers onto the polyvinyl alcohol in the presence of the specific emulsifier can be applied to various heat-sensitive recording materials and can impart an excellent resistance to water, chemicals and sticking and an outstanding color forming property to heat-sensitive recording papers, among others. With these advantages, the present invention can provide outstanding heat-sensitive recording materials which are suited to meet the current requirements unlike the heat-sensitive recording materials produced by application of conventional overcoating agents.

We claim:

1. An overcoating agent for heat-sensitive recording materials which contains as an active component an emulsion of a graft copolymer prepared by graft-copolymerizing an acrylamide or methacrylamide as a monomer (A), a methyl acrylate or methacrylate as a monomer (B), an acrylic or methacrylic acid as a monomer (C) and optionally, a monomer other than said monomers as a monomer (D) which is copolymerizable therewith onto a polyvinyl alcohol in the presence of a fatty acid ester of sucrose and water.

2. An overcoating agent for heat-sensitive recording materials according to claim 1 wherein the emulsion of graft copolymer is one prepared by graft-copolymerizing 5 to 40% by weight of the monomer (A), 40 to 90% by weight of the monomer (B), 1 to 20% by weight of the monomer (C) and 0 to 30% by weight of the monomer (D), of 100% by weight of the total amount of the monomers to be used.

3. An overcoating agent for heat-sensitive recording materials which contains as an active component an emulsion of a graft copolymer prepared by graft-copolymerizing a methyl acrylate or methacrylate as a monomer (E), a lower hydroxyalkyl acrylate or methacrylate as a monomer (F), an acrylic or methacrylic acid as a monomer (G) and optionally, a monomer other than said monomers as a monomer (H) which is copolymerizable therewith onto a polyvinyl alcohol in the presence of a fatty acid ester of sucrose and water.

4. An overcoating agent for heat-sensitive recording materials according to claim 3 wherein the emulsion of graft copolymer is one prepared by graft-copolymerizing 15 to 85% by weight of the monomer (E), 15 to 75% by weight of the monomer (F), 5 to 50% by weight of the monomer (G) and 0 to 30% by weight of the monomer (H), of 100% by weight of the total amount of the monomers to be used.

5. An overcoating agent for heat-sensitive recording materials according to any one of claims 1 to 4 wherein the polyvinyl alcohol is used in an amount of 5 to 50 parts by weight per 100 parts by weight of the total amount of the monomers to be used.

6. An overcoating agent for heat-sensitive recording materials according to any one of claims 1 to 4 wherein the fatty acid ester of sucrose is used in an amount of 1 to 30 parts by weight per 100 parts by weight of the total amount of the monomers to be used.

7. An overcoating agent for heat-sensitive recording materials according to any one of claims 1 to 4 wherein the HLB of the fatty acid ester of sucrose is 1 to 16.

* * * * *